May 15, 1956     F. F. HOFSTATTER     2,745,541
WEAR RESISTING STRUCTURE FOR CONVEYOR BELTS
Filed Jan. 25, 1952     2 Sheets-Sheet 1
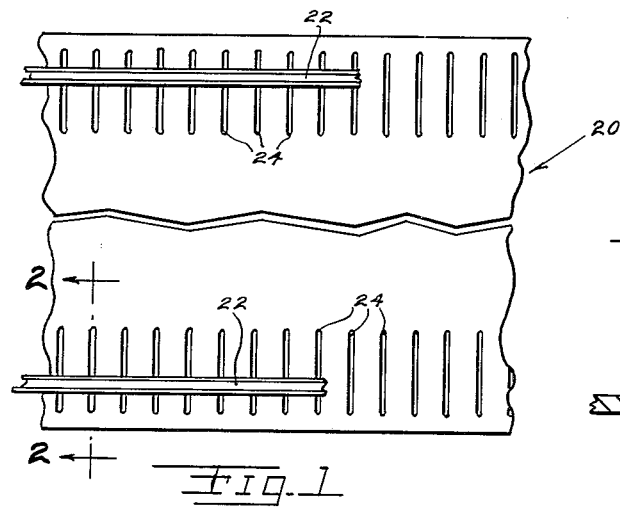
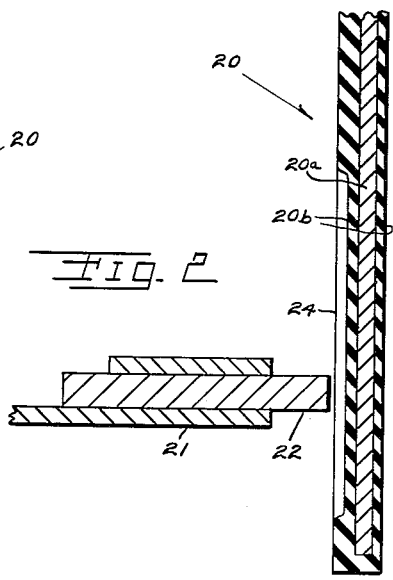
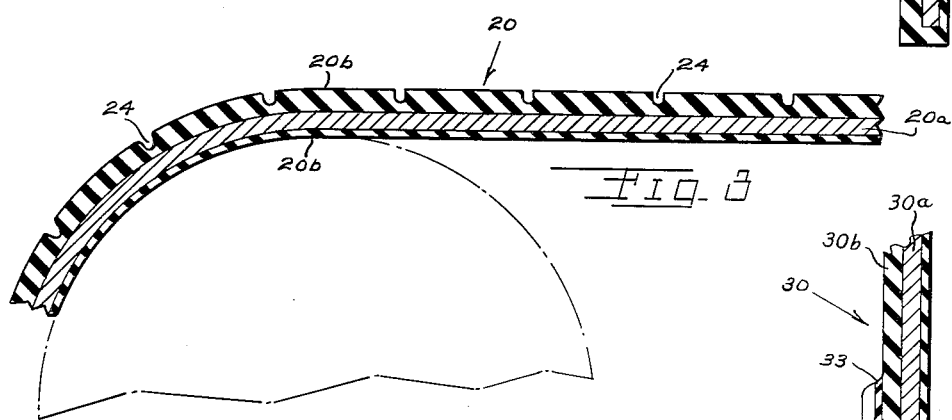
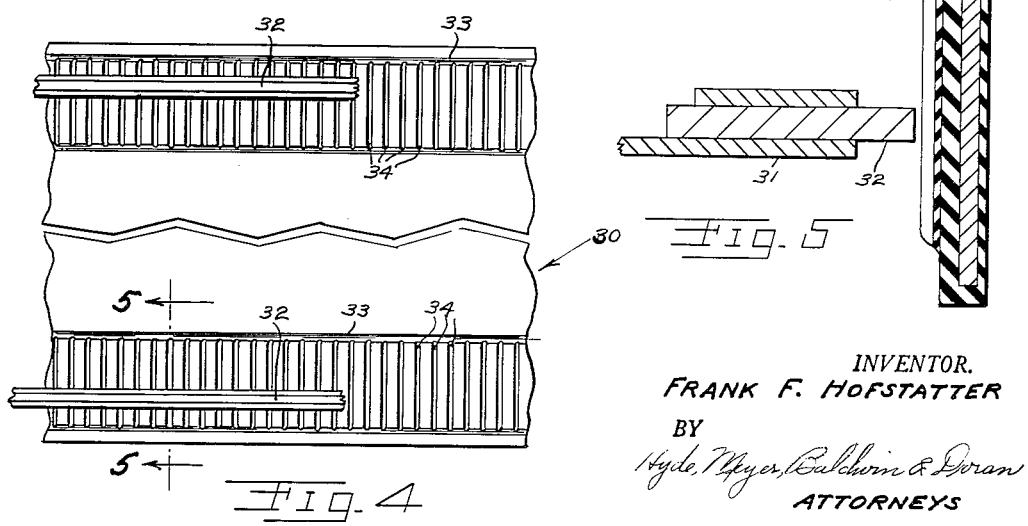
INVENTOR.
FRANK F. HOFSTATTER
BY
Hyde, Meyer, Baldwin & Doran
ATTORNEYS May 15, 1956         F. F. HOFSTATTER         2,745,541
WEAR RESISTING STRUCTURE FOR CONVEYOR BELTS
Filed Jan. 25, 1952                    2 Sheets-Sheet 2
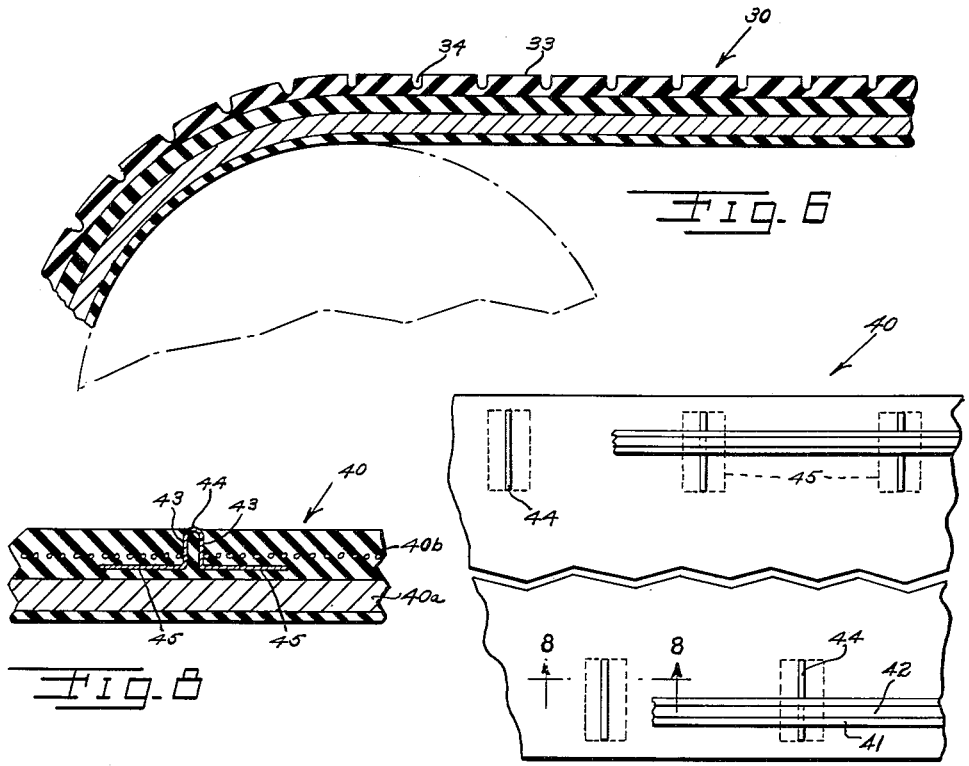
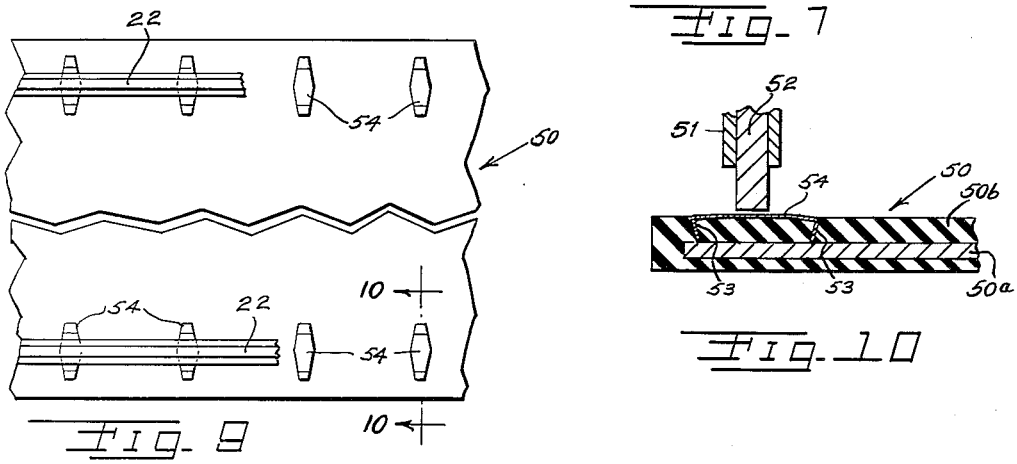
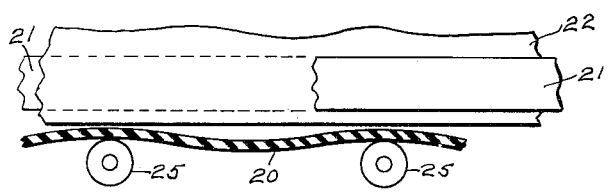
INVENTOR.
FRANK F. HOFSTATTER
BY
Hyde, Meyer, Baldwin & Doran
ATTORNEYS United States Patent Office 2,745,541
Patented May 15, 1956

2,745,541

WEAR RESISTING STRUCTURE FOR CONVEYOR BELTS

Frank F. Hofstatter, Cleveland, Ohio, assignor, by mesne assignments, to General Motors Corporation, Detroit, Mich., a corporation of Delaware Application January 25, 1952, Serial No. 268,160

10 Claims. (Cl. 198—184)

This invention relates to improvements in conveyor belts and more particularly to wear resisting structure therefor.

One of the objects of the present invention is to provide, in a conveyor belt adapted to pass under longitudinally extending spaced side boards of the type described, means on the load carrying surface of said belt for reducing wear on the belt below the side boards.

Another object of the present invention is to provide, in a conveyor belt supported by spaced rollers and passing under longitudinally extending spaced side boards of the type described, scraper members on the material conveying surface of the belt for reducing the abrasive effect of material jammed under the side boards by movement of the belt after some of the material conveyed slides under the side boards while the belt sags between the rollers.

Other features of this invention reside in the arrangement and design of the parts for carrying out their appropriate functions. Other objects and advantages of this invention will be apparent from the accompanying drawings and description, and the essential features will be set forth in the appended claims.

In the drawings,

Fig. 1 is a top view of laterally spaced, longitudinally extending side boards above a conveyor belt having the wear resisting structure of this invention;

Fig. 2 is an enlarged fragmental sectional view taken crosswise of the belt along the line 2—2 of Fig. 1;

Fig. 3 is an enlarged fragmental sectional view taken longitudinally of the conveyor belt shown in Fig. 1 where it passes around an end pulley, either the tail pulley or the head pulley;

Fig. 4 is a top view, similar to Fig. 1, but of a conveyor belt having a modified form of wear resisting structure;

Fig. 5 is an enlarged vertical transverse sectional view taken along the line 5—5 of Fig. 4;

Fig. 6 is an enlarged vertical longitudinal sectional view of the conveyor belt shown in Fig. 4 passing around one of the end pulleys;

Fig. 7 is a top view, similar to Fig. 1, but of a second modified form of wear resisting structure and conveyor belt;

Fig. 8 is an enlarged fragmental sectional view taken along the line 8—8 of Fig. 7 through a portion of the wear resisting structure therefor;

Fig. 9 is a top view, similar to Fig. 1, but of a third modified form of wear resisting structure and conveyor belt;

Fig. 10 is an enlarged fragmental vertical sectional view taken along the line 10—10 of Fig. 9 through a portion of the conveyor belt wear resisting structure and the associated side board therefor; while Fig. 11 is a longitudinal sectional view of a conveyor belt supported by spaced rollers disclosing the sag of the belt between the supporting rollers and under the side boards.

A common type of conveyor structure includes a movable flexible conveyor belt supported by spaced conveyor rollers and laterally spaced, longitudinally extending, stationary side walls extending above the conveyor belt adjacent the lateral edges thereof for keeping loose material on the belt during the conveying operation. Considerable trouble has been experienced with belt wear occurring under these side boards. This wear occurs from loose, abrasive material such as gravel, small stones, etc. getting between the conveyor belt and the side boards while the conveyor belt is conveying the material. This situation is aggravated due to the sag in the belt between the conveyor rollers. Naturally, the gravel will slide out under the side boards as the belt sags, and then, as the belt is carried up over the rollers, this abrasive material is jammed up under the side board causing considerable wear to both the stationary side board and moving conveyor belt. The abrasive action of the conveyed material being wedged between the side boards and the belt cuts narrow grooves in the belt quite close to each edge. This abrasive action is especially noticeable in conveyor loaders wherein all types of soil including gravel, small stones, etc. is loaded. Conveyor loaders of this type are shown in the co-pending application Serial No. 777,887 of Raymond Q. Armington entitled "Conveyor Loader," filed October 4, 1947, and now abandoned, and Patent No. 2,386,187 to Raymond Q. Armington et al., entitled "Conveyor Loader with Diagonal Belt," patented October 9, 1945.

The present invention on a conveyor belt wear resisting structure reduces the wear on the conveyor belt below the side boards. This wear resisting structure consists of spaced irregularities on the surface of the belt under each side board. These irregularities may take the form of protruding members or depressed grooves. The irregularities act as scrapers to scape away the gravel that becomes embedded in the side boards and to reduce belt wear.

One of the preferred forms of the invention is shown in Figs. 1 to 3 inclusive. The conveyor belt, generally shown at 20, is of the flexible type. One type of such flexible conveyor belt is shown in the drawings and comprising a reinforcing fabric 20a being surrounded by rubber 20b vulcanized or laminated thereto. Longitudinally extending stationary side boards, carried by the frame of the conveyor, are spaced from but very close to the lateral edges of the conveyor belt. These side boards extend upwardly from, and generally parallel to, the load-carrying run of the conveyor belt and prevent any loose material carried by the belt from falling off of the lateral edges of the belt. The term side board as used in the present specification and claims, is intended to cover not only a solid side board but also a side board composed of several parts. An example of the latter is shown in Fig. 2 wherein each side board consists of a skirt board 21 having a wiping or sealing strip 22 attached thereto and extending down until it nearly touches the upper surface of the load-carrying run of the conveyor belt. The wear resisting structure comprises longitudinally spaced irregularities carried by the upper surface of the belt under the side boards. In Figs. 1 to 3 inclusive, these irregularities consist of transverse grooves 24 in the top or load-carrying surface of the conveyor belt. Each groove extends laterally on each side of its associated side board as shown in Fig. 1.

Another of the preferred forms of the invention is shown in Figs. 4 to 6 inclusive. The conveyor belt, generally shown at 30, is of the flexible type. The flexible conveyor belt shown in the drawings comprises a reinforcing fabric 30a being surrounded by rubber 30b vulcanized or laminated thereto. Longitudinally extending stationary side boards are spaced from but very close to the lateral edges of the conveyor belt. Each side board consists of a skirt board 31 having a wiping or sealing strip 32 attached thereto and extending down until it nearly touches the upper surface of the load-carrying run of the conveyor belt. The wear resisting structure comprises longitudinally spaced irregularities carried by the upper surface of the belt under the side boards. In Figs. 4 to 6 inclusive, a raised bead 33 is either vulcanized to the top surface of the belt or is formed integral therewith. Transverse grooves 34 in the top surface of the bead extend laterally on each side of its associated side board.

Another form of the invention is shown in Figs. 7 and 8. The conveyor belt, generally shown at 40, is of the flexible type. The illustrated flexible conveyor belt comprises a reinforcing fabric 40a surrounded by rubber 40b vulcanized or laminated thereto. Longitudinally extending stationary side boards are spaced from but very close to the lateral edges of the conveyor belt. Each side board consists of a skirt board 41 having a wiping or sealing strip 42 attached thereto and extending down until it nearly touches the upper surface of the load-carrying run of the conveyor belt. The wear resisting structure comprises longitudinally spaced irregularities carried by the upper surface of the belt under the side boards. In Figs. 7 and 8, spaced, relatively hard metallic or plastic members are embedded in the rubber portion 40b of the belt. These members may be vulcanized in this rubber portion, if desired. Each of said members has an upwardly extending portion 44 protruding slightly above the surface of the belt and extending laterally on opposite sides of its associated side boards. Each embedded member has a pair of legs 43 extending downwardly from opposite sides of the upwardly extending portion 44. Each leg 43 extends transversely to the direction of belt travel, as seen in Fig. 7, and has a locking flange 45 extending in the direction of belt travel and firmly secured in the rubber portion 40b of the conveyor belt.

Another form of the invention is shown in Figs. 9 and 10. The conveyor belt, generally shown at 50, is of the flexible type. In the present disclosure, the flexible conveyor belt comprises a reinforcing fabric 50a being surrounded by rubber 50b vulcanized or laminated thereto. Longitudinally extending stationary side boards are spaced from but very close to the lateral edges of the conveyor belt. Each side board consists of a skirt board 51 having a wiping or sealing strip 52 attached thereto and extending down until it nearly touches the upper surface of the load-carrying run of the conveyor belt. The wear resisting structure comprises longitudinally spaced irregularities carried by the upper surface of the belt under the side boards. In Figs. 9 and 10, metallic or plastic belt clips or rib plates are vulcanized or embedded in any other manner in the conveyor belt 50. Each belt clip has an inverted U-shape with downwardly extending legs 53 usually embedded in the belt by driving the clip into the belt. Between the legs is an upwardly extending portion 54 protruding above the upper surface of the conveyor belt. It should be noted that the legs in Fig. 9 extend longitudinally to the direction of belt travel and that each belt clip extends laterally on opposite sides of its associated side board.

It should now be apparent that each of the four conveyor belts disclosed has longitudinally spaced irregularities carried by its upper surface lying under the side boards and extending laterally on each side thereof.

The vertical sectional view in Fig. 11 discloses how the belt sags between the spaced conveyor supporting rollers. Conveyor belt 20 has been selected for illustration and is shown as extending under the skirt board 21 and the wiping or sealing strip 22 and as being supported by the spaced conveyor rollers 25. Gravel, small stones, etc. and other loose material carried by the conveyor belt slide laterally between the belt and the wiping strip or side board when the belt sags. As the belt is carried up over the roller, this material is jammed up under the stationary wiping strip. The strip 22 is often cut from an old conveyor belt comprising laminations of rubber and fabric. Bits of gravel or stone often become embedded in the edge of strip 22 exposed toward belt 20. In any case, loose material is ground between the belt and side board over the rollers 25. In the conventional belt structure, this action causes considerable wear to both the wiping strip and the conveyor belt and cuts narrow grooves in the conveyor belt quite close to each edge. The spaced irregularities carried by the upper surface of the conveyor belt, as shown in various forms in Figs. 1 to 10 inclusive, serve as wear resisting structures. These irregularities act as scraper or cleaning members to reduce the abrasive effect of the material jammed under the side boards by movement of the belt after the material has slid under the stationary side boards while the belt sags between spaced supporting roller.

These irregularities on the belt surface will tend to clean the lower edge of each side board. In this way, the structure keeps a working clearance relatively free of gravel and small stones between the side boards and the conveyor belt. As the grooves continue to clean the loose material from below the side boards, they will tend to fill with dirt and this dirt will also act as a wear resisting element between the side boards and the conveyor. In Figs. 3 and 6, as the conveyor travels over the tail pulley and head pulley of the conveyor structure, the grooves 24 and 34 will open up and tend to throw out the dirt. Hence, the conveyor belts shown in Figs. 3 and 6 are self-cleaning. Obviously, the members 44 and 54 are of wear resisting character and protect the belt against excessive abrasion.

Various changes in details and arrangement of parts can be made by one skilled in the art without departing from the spirit of this invention or the scope of the appended claims.

What I claim is:

1. A conveyor belt wear resisting structure, comprising a continuous one piece conveyor belt having resilient homogeneous surfaces adapted to have its load material carrying surface supported by a plurality of spaced conveyor rollers and adapted to pass under longitudinally extending side boards, longitudinally spaced irregularities carried by the upper surface of said belt for traveling under said side boards, said irregularities comprising transverse grooves in raised beads under said side boards on the top of said load carrying belt surface, whereby said spaced irregularities reduce the abrasive effect of the material jammed under said side boards by the movement of the belt.

2. A conveyor belt wear resisting structure, comprising a continuous one piece conveyor belt having resilient homogeneous surfaces adapted to have its load material carrying surface supported by a plurality of spaced conveyor rollers and adapted to pass under longitudinally extending side boards, longitudinally spaced irregularities carried by the upper surface of said belt for traveling under said side boards, said irregularities comprising transverse grooves permanently molded in the top of said load carrying belt surface, each groove adapted to extend laterally on each side of its associated side board whereby said spaced irregularities reduce the abrasive effect of the material jammed under said side boards by the movement of the belt.

3. A conveyor belt wear resisting structure, comprising a conveyor belt at least partially formed of rubber and adapted to have its load material carrying surface supported by a plurality of spaced conveyor rollers and adapted to pass under longitudinally extending side boards, longitudinally spaced irregularities carried by the upper surface of said belt for traveling under said side boards, said irregularities comprising relatively hard metallic members embedded in said rubber portion, whereby said spaced irregularities reduce the abrasive effect of the material jammed under said side boards by the movement of the belt.

4. In combination, a longitudinally movable continuous one piece conveyor belt having resilient homogeneous surfaces for conveying material, a plurality of spaced rollers for supporting the load-carrying run of said belt, longitudinally extending side boards above said conveyor belt run and adjacent its lateral edges, and wear resistant means comprising longitudinally spaced irregularities independent of the load carrying surface of said belt on said belt under said side boards and above said rollers and spaced from the side edges of said belt leaving strips of belt material along the side edges of said belt free of wear resistant means for reducing the abrasive effect of the load material jammed under said side boards by the movement of the belt.

5. In combination, a longitudinally continuous one piece movable conveyor belt having resilient homogeneous surfaces for conveying material, a plurality of spaced rollers for supporting the load-carrying run of said belt, longitudinally extending side boards above said conveyor belt run and adjacent its lateral edges, and wear resistant means other than the belt itself on said belt under said side boards for reducing the abrasive effect of the load material jammed under said side boards by the movement of the belt, said means forming longitudinally spaced irregularities carried on the upper surface of said belt under said side boards and above said rollers and spaced from the side edges of said belt leaving strips of belt material along the side edges of said belt free of wear resistant means.

6. In combination, a longitudinally movable continuous one piece conveyor belt for conveying material, a plurality of spaced rollers for supporting the load-carrying run of said belt, longitudinally extending side boards above said conveyor belt run and adjacent its lateral edges, and wear resistant means on said belt under said side boards for reducing the abrasive effect of the load material jammed under said side boards by the movement of the belt, said means comprising spaced transversely extending grooves formed in raised beads on the upper surface of said belt under said side boards.

7. In combination, spaced belt pulleys, a longitudinally movable one piece endless conveyor belt having resilient homogeneous surfaces on said pulleys for conveying material, a plurality of spaced rollers for supporting the load-carrying run of said belt, longitudinally extending side boards above said conveyor belt run and adjacent its lateral edges, and wear resistant means on said belt under said side boards for reducing the abrasive effect of the load material jammed under said side boards by the movement of the belt, said means comprising spaced transversely extending grooves permanently molded in the upper resilient surface of said belt under said side boards, said grooves opening up as they go around one of said pulleys and being self-cleaning.

8. In combination, a longitudinally movable conveyor belt for conveying material, a plurality of spaced rollers for supporting the load-carrying run of said belt, longitudinally extending side boards above said conveyor belt run and adjacent its lateral edges, and wear resistant means on said belt under said side boards for reducing the abrasive effect of the load material jammed under said side boards by the movement of the belt, said means including spaced members embedded in said belt and each having a portion extending above the upper surface thereof under said side boards.

9. In combination, spaced belt pulleys, a longitudinally movable endless conveyor belt on said pulleys for conveying material, a plurality of spaced rollers for supporting the load-carrying run of said belt, longitudinally extending side boards above said conveyor belt run and adjacent its lateral edges, and wear resistant means on said belt under said side boards for reducing the abrasive effect of the load material jammed under said side boards by the movement of the belt, said means including spaced relatively hard members embedded in said belt and each having a portion extending above the upper surface thereof under said side boards, each of said members having legs embedded in said belt on opposite sides of said upwardly extending portion, said legs extending transversely to the direction of belt travel.

10. In combination, spaced belt pulleys, a longitudinally movable endless conveyor belt on said pulleys for conveying material, a plurality of spaced rollers for supporting the load-carrying run of said belt, longitudinally extending side boards above said conveyor belt run and adjacent its lateral edges, and wear resistant means on said belt under said side boards for reducing the abrasive effect of the load material jammed under said side boards by the movement of the belt, said means including spaced relatively hard members embedded in said belt and each having a portion extending above the upper surface thereof under said side boards, each of said members having legs embedded in said belt on opposite sides of said upwardly extending portion, said legs extending longitudinally to the direction of belt travel.

References Cited in the file of this patent

UNITED STATES PATENTS

| Number | Name | Date |
|---|---|---|
| 933,365 | Cory et al. | Sept. 7, 1909 |
| 1,462,272 | Fabeck | July 17, 1923 |
| 2,055,932 | Kitchen | Sept. 29, 1936 |
| 2,129,337 | Spears | Sept. 6, 1938 |
| 2,323,368 | Biedess | July 6, 1943 |

FOREIGN PATENTS

| 375,700 | Great Britain | June 30, 1932 |